E. B. BENNETT & J. ARMSTRONG.
COMBINED GAGE AND COMPASS.
APPLICATION FILED JAN. 16, 1915.
1,155,542. Patented Oct. 5, 1915.
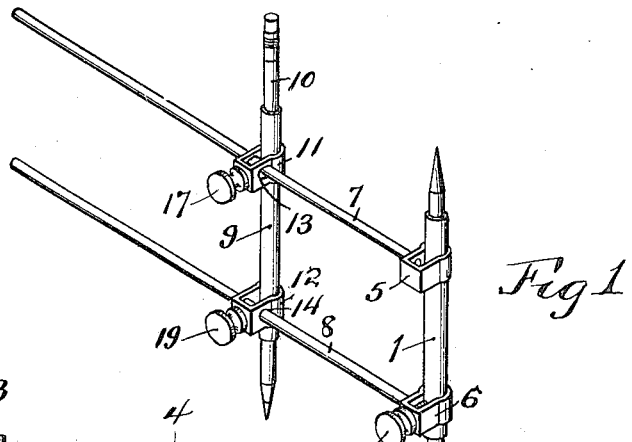
Fig 1
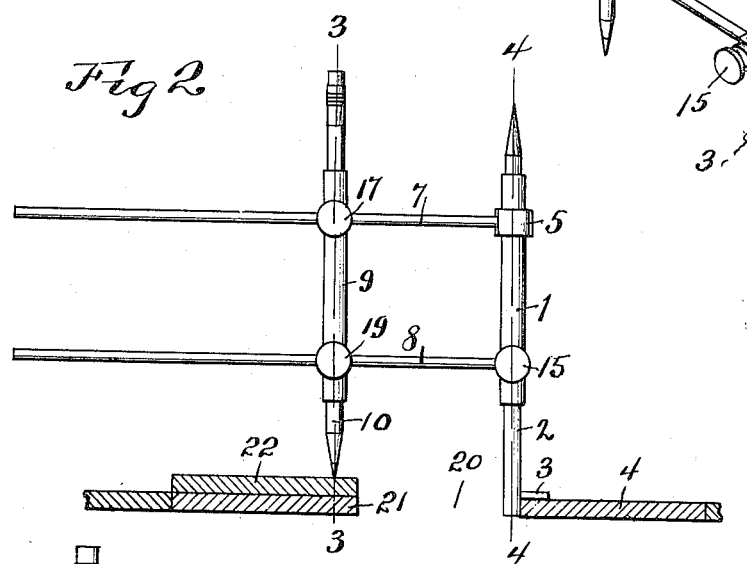
Fig 2
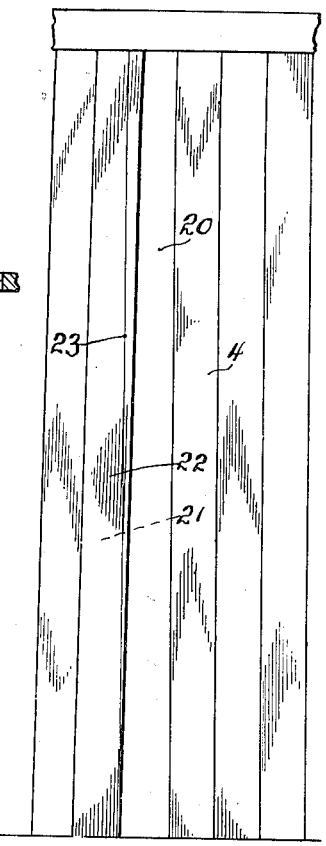
Fig 7
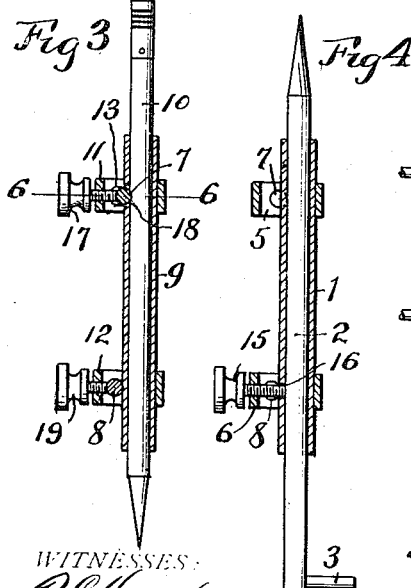
Fig 3   Fig 4
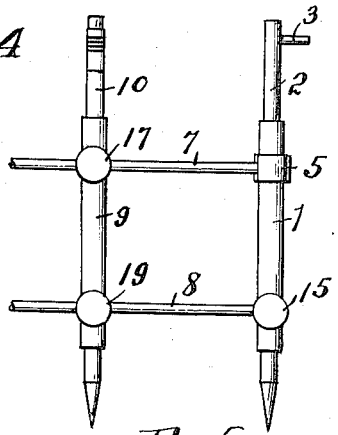
Fig 5
Fig 6
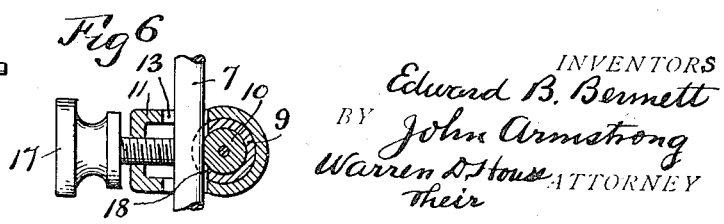
WITNESSES:
R. E. Hamilton
E. B. House
INVENTORS
Edward B. Bennett
John Armstrong
BY Warren D. House
their ATTORNEY

UNITED STATES PATENT OFFICE.

EDWARD B. BENNETT AND JOHN ARMSTRONG, OF KANSAS CITY, KANSAS.

COMBINED GAGE AND COMPASS.

1,155,542.   Specification of Letters Patent.   Patented Oct. 5, 1915.

Application filed January 16, 1915. Serial No. 2,590.

*To all whom it may concern:*

Be it known that we, EDWARD B. BENNETT and JOHN ARMSTRONG, citizens of the United States, residing at Kansas City, in the county of Wyandotte and State of Kansas, have invented a certain new and useful Improvement in Combined Gages and Compasses, of which the following is a specification.

Our invention relates to improvements in combined gages and compasses.

The object of our invention is to provide an instrument which may be used as a gage or as a compass, which may be readily adjusted for the purposes for which it is designed, which is simple in construction and economical to manufacture.

The novel features of our invention are hereinafter fully described and claimed.

In the accompanying drawing, which illustrates the preferred embodiment of our invention, Figure 1 is a perspective view of our improved gage and compass. Fig. 2 is an elevation of our improved gage and compass shown applied to some boards of a partition, the boards being shown in cross section. Fig. 3 is a vertical sectional view, enlarged, on the line 3—3 of Fig. 2. Fig. 4 is a vertical section on the line 4—4 of Fig. 2. Fig. 5 is an elevation view of our improved instrument with the parts arranged to form a compass. Fig. 6 is a cross section, enlarged, on the line 6—6 of Fig. 3. Fig. 7 is an elevation view of a partition in the construction of which our improved instrument is adapted to be employed.

Similar reference characters designate similar parts in the different views.

The instrument is provided with a tubular holder comprising a tube 1 in which is rotatably and slidably mounted a cylindrical gage member 2 provided adjacent to one end with a lateral projection 3 which is adapted, as shown in Fig. 2, to rest upon a board 4, the member 2 being adapted to have a sliding engagement with one edge of the board 4, when the instrument is being used as hereinafter described.

Secured to the tube 1 and forming part of the tubular holder are two yokes 5 and 6 to which are respectively secured one set of ends of two parallel rods 7 and 8 which extend horizontally at right angles to the tube 1 and form lateral arms of said tubular member upon which is slidably mounted a pencil holder consisting of a tube 9, which is disposed parallel to the tube 1 and which is adapted to contain a pencil 10.

Secured to the tube 9 are two yokes 11 and 12 provided respectively with transverse holes 13 and 14 in which are respectively slidably mounted the arms or rods 7 and 8.

For securely locking the gage member 2 in the position to which it may be adjusted, the yoke 6 is provided with a transverse screw-threaded hole in which is fitted a clamping screw 15, Fig. 4, which is adapted to extend through a transverse hole 16 provided therefor in one side of the tube 1.

For holding the pencil 10 in the tube 9, the yoke 11 is provided, Fig. 3, with a screw-threaded hole in which is fitted a clamping screw 17 which is adapted to bear against the rod or arm 7, and force it in the hole 13 against the pencil 10, the side of the tube 9 being, for this purpose, provided with a slot 18, which is intersected by the hole 13.

For clamping the pencil holder to the arm 8, the yoke 12 is provided with a screw-threaded hole in which is fitted a clamping screw 19, the inner end of which is adapted to bear against the rod or arm 8.

When it is desired to employ the instrument as a compass, the screw 15 may be loosened, the gage member 2 withdrawn from the tube 1 and then reinserted in the tube 1 with its ends reversed, as shown in Fig. 5, and the screw 15 then tightened. By loosening the screws 17 and 19, the pencil holder is released from the arms 7 and 8 and may be adjusted thereon to the desired distance from the gage member 2, one end of which is pointed to enable the device being readily used as a compass. When the screws 17 and 19 are again tightened, the pencil 10, which may be longitudinally adjusted, will be held tightly clamped as will be the arms 7 and 8.

When it is desired to use the instrument for laying off a board to be fitted in a vacant space, such as the space 20, Fig. 7, between two boards of a partition, such as the boards 4 and 21, Fig. 2, the parts are assembled, as shown in Fig. 2, the point of the pencil 10 being set at a distance from the right side of the gage member 2, as viewed in Fig. 2, equal to the width of the board 21.

The board which is to be used to fill the space 20, such as the board 22, Figs. 2 and 7, is then laid on the board 21 with its left edge alined with the left edge of the board 21, as viewed in Figs. 2 and 7. The instrument is then applied as shown in Fig. 2 with the side of the gage member 2 bearing against the left edge of the board 4, and the projection 3 resting upon the face of said board. By drawing the gage member 2, while held in this position, the full length of the board 4, with the lead point of the pencil 10 resting upon the outer side of the board 22, a pencil line 23, Fig. 7, will be drawn lengthwise of the board 22. The portion at the left of said pencil line, as viewed in Fig. 7, will fit in the space 20, after the board has been ripped lengthwise along the line 23. A board may thus be laid off which will fit any desired space to be filled between boards of a partition or other place, whether the width of the space is regular or irregular, providing the board used to fill the space is of the same or greater width than the width of the space at the widest part.

When the instrument is to be used as an ordinary gage for laying off a line parallel with one edge of a board, the screw 15 may be loosened and the gage member 2 turned in the tube 1 to a position in which the projection 3 will be in the position shown in dotted lines in Fig. 1, in which position it will be adapted to rest upon the board to be marked while the pencil 10 is also resting thereon.

We do not limit our invention to the structure shown and described, as modifications, within the scope of the appended claims, may be made without departing from the spirit of our invention.

What we claim is:—

1. In a combined gage and compass, a tubular holder provided with a lateral arm and having a lateral hole extending to the longitudinal opening in the holder, a gage member slidably and rotatably mounted in said holder and provided with a lateral projection adapted to serve as a support, a screw fitted in said lateral hole and adapted to bear against said gage member, and a pencil holder longitudinally adjustable on said arm toward and from said gage member.

2. In a combined gage and compass, a tubular holder provided with a lateral arm and having a lateral hole extending to the longitudinal opening in the holder, a gage member slidably and rotatably mounted in said holder and adapted to be reversed end for end therein and provided with one pointed end, the other end of said gage member having adjacent thereto a lateral projection adapted to serve as a support, a screw fitted in said lateral hole and adapted to bear against said gage member, and a pencil holder longitudinally adjustable on said arm toward and from said gage member.

3. In a combined gage and compass, a tubular holder provided with a lateral arm, a gage member mounted in said holder and provided adjacent to one end with a lateral projection adapted to serve as a support, a tubular pencil holder provided with a transverse hole which intersects the longitudinal opening of said pencil holder and in which said arm is longitudinally slidable and laterally movable to a position in which the arm will be adapted to clamp a pencil mounted in the longitudinal opening of the pencil holder, and clamping means adapted to releasably lock the pencil holder to said arm and to clamp said arm against said pencil.

4. In a combined gage and compass, a tubular holder provided with a lateral arm, a gage member mounted in said holder and provided adjacent to one end with a lateral projection adapted to serve as a support, a tubular pencil holder having a transverse hole intersecting the longitudinal opening of the pencil holder and in which said arm is longitudinally slidable and laterally movable to a position in which the arm will be adapted to clamp a pencil mounted in the longitudinal opening of the pencil holder, the pencil holder having a screw-threaded hole which intersects said transverse hole, and a clamping screw fitted in said screw-threaded hole and adapted to force said arm tightly against a pencil mounted in said pencil holder and to releasably lock the pencil holder to said arm.

5. In a combined gage and compass, a tubular holder provided with a lateral arm and having a lateral hole extending to the longitudinal opening of the holder, a gage member rotatably and slidably mounted in said holder and provided with a lateral projection adapted to serve as a support, a screw fitted in said lateral hole and adapted to bear against said gage member, a tubular pencil holder having a transverse hole intersecting the longitudinal opening of the pencil holder, said arm being longitudinally slidable in and laterally movable to a position in said transverse hole in which the arm will be adapted to clamp a pencil mounted in the longitudinal opening of the pencil holder, and clamping means adapted to releasably lock the pencil holder to said arm and to force said arm against said pencil.

In testimony whereof we have signed our names to this specification in presence of two subscribing witnesses.

EDWARD B. BENNETT.
JOHN ARMSTRONG.

Witnesses:
WARREN D. HOUSE,
E. B. HOUSE.